US008027296B2

(12) United States Patent
Hu et al.

(10) Patent No.: US 8,027,296 B2
(45) Date of Patent: Sep. 27, 2011

(54) DYNAMIC MOBILE SERVICE CONTROL DEPLOYMENT ARCHITECTURE

(75) Inventors: Q. James Hu, Sammamish, WA (US);
Douglas Eng, Sammamish, WA (US);
Terry Figurelle, Redmond, WA (US);
Michael Britt, Everett, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 741 days.

(21) Appl. No.: 12/116,893

(22) Filed: May 7, 2008

(65) Prior Publication Data

US 2009/0227231 A1 Sep. 10, 2009

Related U.S. Application Data

(60) Provisional application No. 61/034,905, filed on Mar. 7, 2008.

(51) Int. Cl.
*H04W 4/00* (2009.01)
*H04L 12/66* (2006.01)

(52) U.S. Cl. .................... 370/329; 370/342; 370/352

(58) Field of Classification Search .................. None
See application file for complete search history.

(56) References Cited

U.S. PATENT DOCUMENTS

| 6,529,490 | B1 * | 3/2003 | Oh et al. | 370/331 |
| 6,922,413 | B1 * | 7/2005 | Hume et al. | 370/410 |
| 2003/0108015 | A1 * | 6/2003 | Li | 370/338 |
| 2004/0073928 | A1 * | 4/2004 | Alakoski et al. | 725/62 |
| 2005/0165917 | A1 * | 7/2005 | Le et al. | 709/220 |
| 2006/0182061 | A1 * | 8/2006 | Naghian | 370/331 |
| 2007/0066286 | A1 * | 3/2007 | Hurtta | 455/414.1 |
| 2008/0192716 | A1 * | 8/2008 | Shaheen | 370/338 |

FOREIGN PATENT DOCUMENTS

WO  WO 2004/029854 A  4/2004

OTHER PUBLICATIONS

International Search Report and Written Opinion for PCT/US2009/036418, Jun. 3, 2009, consists of 12 unnumbered pages.
International Preliminary Report on Patentability for PCT/US2009/036418, Sep. 7, 2010, consists of 9 unnumbered pages.
3GPP ORG: "3GPP TS 23.203 v7.5.0. $3^{rd}$ Generation Partnership Project; Technical Specification Group Services and System Aspects; Policy and charging control architecture (Release 7)" [Online] Dec. 1, 2007, Retrieved from the Internet: URL:http//www.3gpp.org/ftp/Specs/html-info/23203.htm> retrieved on May 13, 2009.

* cited by examiner

*Primary Examiner* — Chi Pham
*Assistant Examiner* — Soon-Dong Hyun

(57) ABSTRACT

A dynamic mobile service control architecture for policy-based control and charging of a mobile data network is described. Reference point links logically connecting a subscription profile repository and a service gateway allows the service gateway to receive information about a subscription to a service by a subscriber and forward this subscription information to an external application function that is providing the service to the subscriber through the mobile data network. Reference point links logically connecting a policy server with the service gateway allows the service gateway to receive and enforce policy rules on service data flows passing through the service gateway.

20 Claims, 4 Drawing Sheets

DYNAMIC MOBILE SERVICE CONTROL DEPLOYMENT ARCHITECTURE

BACKGROUND OF THE INVENTION

1. Field of the Invention

The present invention is directed generally to the control of data networks serving mobile wireless users. In particular, the present invention is directed to a system for policy management in a data network that uses policy rules to control and charge services.

2. Description of the Related Art

Operators of mobile wireless networks have in recent years added data networks to their core networks to allow them to offer data services to their mobile subscribers. However, network operators did not develop unified systems for controlling subscriber access and did not develop a unified way to charge for data services. For example, a network operator may have deployed one control and charging system at a network gateway for general access to data network services and then deployed control and charging systems for each individual service offered. However, this approach has become increasingly burdensome as network operators want to deploy ever more services.

New services could be deployed faster and with less expense if each new service did not require a new controlling and charging system. To meet this need, standards bodies have proposed unified policy and charging control architectures. One example of this effort is the 3GPP R7 Policy Control and Charging Architecture. (See Technical Specification 23.203 V8.0.0 (2007-12), which is incorporated by reference in its entirety). This architecture allows customized control and charging policies to be made and enforced for unique combinations of subscribers and services. Each subscriber may have a unique assortment services that they are allowed to use, at rates unique to the subscriber. Each service may have unique requirements for network resources in order to properly provide the service.

In the 3GPP architecture, control and charging enforcement is performed in an access gateway between a carrier's data access network and service providing networks. The gateway has a policy enforcement engine called a Policy Control and Charging Enforcement Function (PCEF) in 3GPP. The PCEF examines packets passing through the gateway and enforces control and charging policy decisions on the packets. These policy decisions are generated by a policy decision engine called a Policy Control and Charging Rules Function (PCRF) in 3GPP. A Gx reference point carries subscriber information and access session information from the PCEF to the PCRF and policy decisions from the PCRF to the PCEF. To generate policy decisions, the PCRF needs subscription information from a subscription profile repository and service information from an internal application function. An Sp reference point carries subscription information from the subscription profile repository to the PCRF. An Rx reference point carries service information from the internal application function to the PCRF.

The 3GPP architecture described above is designed for enforcement of policy decisions by the PCEF in the access gateway. However, it does not provide the flexibility to enforce policy decisions at gateways in a carrier's service providing network. Therefore, it can be appreciated that there is a significant need for a system to provide policy enforcement capabilities at access gateways. The present invention provides this and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Described herein are several embodiments of a new dynamic mobile service control architecture. This new architecture introduces new logical elements, new reference points linking the logical elements, and new topographies arranging logical elements and reference points. These new logical elements and reference points allow the architecture to perform policy control and charging more efficiently. Some embodiments of this new architecture can be considered extensions of the 3GPP architecture in the sense that this invention does not contradict the 3GPP standard. However, some embodiments for this new architecture are not fully compliant with 3GPP. Additionally, the invention does not depend on the 3GPP standard and other embodiments of this new architecture apply the principals of this invention in an architecture not fully compliant with 3GPP.

In the Figures, various objects are identified with reference numbers. If there are multiple copies of the same object in a figure, they will be referred to by the same reference number but with a different suffix letter appended. In the following discussion, if a reference is made to a reference number that identifies multiple objects but without a suffix letter appended, then the reference is to all the multiple objects as a group.

Figure 1:
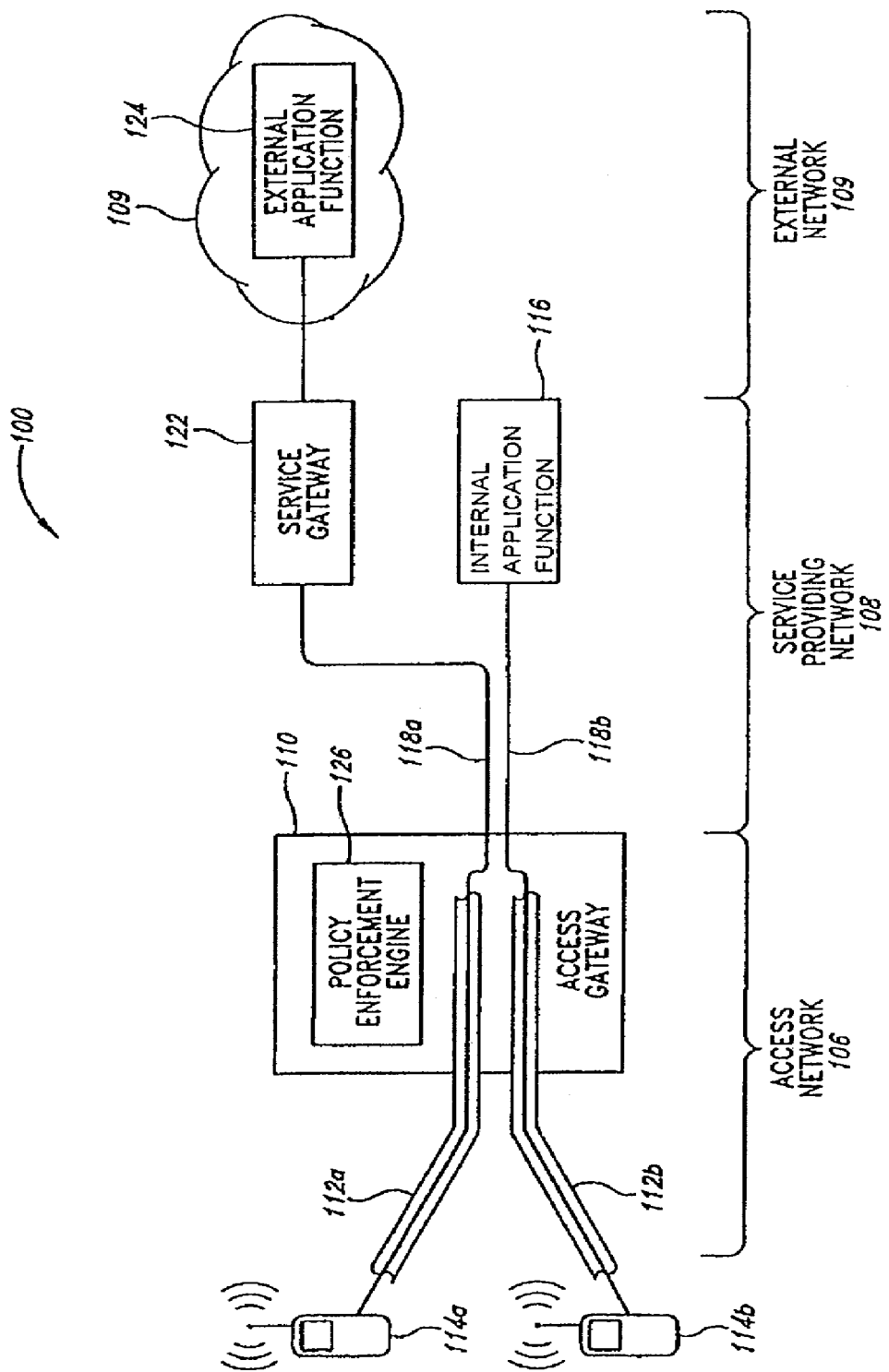
FIG. 1 shows the traffic plane of a mobile data network.

FIG. 1 shows an example of a mobile data network 100. For the sake of clarity, FIG. 1 only shows the traffic plane of the mobile data network 100. FIG. 1 omits logical elements that only exist in the signal plane and omits signal plane reference point links. The mobile data network 100 is divided into an access network 106 and a service providing network 108. An access gateway 110 is part of the access network 106 and demarks a boundary with the service providing network 108. The service providing network 108 has an internal application function 116 and a service gateway 122. The access network 106 is configured to set up access bearers 112 to connect mobile devices 114 the access gateway 110. The access bearers 112 are data packet transmission paths of a defined capacity, delay and bit error rates. In the example of FIG. 1, the access network 106 sets up a first access bearer 112a between a first mobile device 114a and the access gateway 110. The access network 106 sets up a second access bearer 112b between a second mobile device 114b and the access gateway 110. Each of the mobile devices 114 is registered on the mobile data network 100 to a subscriber, usually one mobile device 114 to a subscriber. In the example of FIG. 1, the first mobile device 114a is registered to a first subscriber and the second mobile device 114b is registered to a second subscriber.

The internal application function 116 is configured to provide a service to the second mobile device 114b. The internal application function 116 may provide more than one session of the service. Each service session may go to a different mobile device 114, though multiple sessions may go to the same mobile device. For example, the internal application function 116 could provide a stock market ticker service session that would keep a portfolio of stocks updated in the second mobile device 114b while a separate session provides the second mobile device 114b with stock purchase or sale information.

Each access bearer 112 may carry one or more service data flows 118. In the example of FIG. 1, the first access bearer 112a carries a first service data flow 118a and the second access bearer 112b carries a second service data flow 118b. A service data flow 118 comprises a stream of data packets exchanged between logical elements participating in a service session. Service data flows 118 may be unidirectional or bidirectional. In the example of FIG. 1, the second service data flow 118b comprises data packets for a particular service exchanged between the internal application function 116 and the second mobile device 114b through the second access bearer 112b.

Data packets can be identified as belonging to the same service data flow by identifying information in the data packets, usually the Internet Protocol (IP) addresses and port numbers of the logical elements (e.g., the first mobile device 114a and the internal application function 116) participating in the service session. A service session may have more than one service data flow 118 and an access bearer 112 may carry more than one service data flow 118. The number of service data flows 118 that a particular service can carry is determined by the capacity of the access bearer 112 and its ability to meet the quality of service (QoS) requirements of the one or more service data flows 118 that it is carrying.

The service gateway 122 is configured to route service data flows between the mobile data network 100 and an external network 109. The external network 109 is a wide area network (WAN) that is not part of the mobile data network 100. The external network 109 has one or more external application functions to provide services. In some embodiments, the service gateway 122 is configured to translate a service data flow (e.g., the first service data flow 118a) from a first protocol to a second protocol to permit communication with an external application function 124. The service gateway 122 allows the external application function 124 to provide a service session to a mobile device (e.g., the first mobile device 114a). For example, the external application function 124 may provide web pages in Hyper-Text Mark-up Language (HTML) protocol and the service gateway 122 translates the HTML into Web Access Protocol (WAP). The external application function 124 provides the service session over the first service data flow 118a, which passes through the service gateway 122, through the access gateway 110 and through the first access bearer 112a.

The policy enforcement engine 126 is a logical element located in the access gateway 110 that applies policy decisions to service data flows 118 passing through the access gateway 110. Policy decisions are based on policies established by an operator of the mobile data network 100.

The term "policy," as used herein, is a set of instructions for handling one or more service data flows 118 between logical elements participating in a session of a service. The handling instructions may include controlling instructions, charging instructions or both. The policy may be very generic and be applicable to many different services and subscribers. Alternatively, the policy may be specific to a category of services or to a specific service while applicable for many different subscribers. In yet another alternative, the policy may be specific to a category of subscribers or to a specific subscriber while applicable for many different services. In still yet another alternative, the policy may be specific to a subscriber and specific to a service, but not to a session of the specific service.

While a policy may be broadly generic or directed to specific types of services or subscribers, the policy is generally missing at least some information needed for handling for a specific subscriber or a specific service or a specific session of the specific service. This missing information is referred to herein as "context data." Context data includes subscription information and/or service information. Subscription information may include a list of services that a specific subscriber is allowed to access. Subscription information may include specific instruction parameters on how to deliver a service, such as a unit price to charge an account belonging to the subscriber.

Service information includes service data flow filters or includes information that can be used to generate one or more service data flow filters. The service data flow filters can be used to identify one or more service data flows 118. This information identifying a service data flow usually includes the Internet Protocol (IP) addresses and port numbers of the logical elements (e.g., the first mobile device 114a and the internal application function 116) participating in the service session. Service information may also include Quality of Service (QoS) requirements for the specific service session. For example, a set of service information may include a QoS requirement for a minimum bit rate of 150 kilobits per second.

As will be described in greater detail below, the policy and the context data are combined to generate a "policy rule," which includes sufficient information to permit decisions to be made regarding one or more service data flows (e.g., the second service data flow 118b) carrying a specific service session for a specific subscriber. A policy decision comprises a set of policy rules bound to information identifying an access bearer (e.g., the second access bearer 112b).

The policy enforcement engine 126 enforces a policy decision by examining data packets passing through the access bearer (e.g., the second access bearer 112b) identified by the policy decision. The data packets are examined to detect service data flows 118 that match one of the filters in the policy decision. The policy enforcement engine 126 applies the instructions in the policy decision to the packets in the matching service data flow 118. For example, suppose the internal application function 116 provides a remote presentation service to the second mobile device 114b. This remote presentation service displays a series of images, such as slides used in a talk. The series of images are carried by the second service data flow 118b through the second access bearer 112b. The policy enforcement engine 126 is loaded with a policy decision generated for the remote presentation service session. The policy decision has information identifying the second access bearer 112b and has a policy rule with a service data flow filter. The policy enforcement engine 126 examines the packets passing through the second access bearer 112b, looking for matches to the service data flow filter. The packets that match the service data flow filter belong to the second service data flow 118b. The policy enforcement engine 126 applies the policy rule to any packet identified as belonging to the second service data flow 118b. This policy rule may have charging instructions directing, for example, an on-line charging system charge $0.0001 per bit in the packet to the account of the second subscriber (i.e., the owner of the second mobile device 114b). The policy rule may have control instructions directing, for example, that the QoS class identifier in the packet header be set to class 5.

The exemplary mobile data network 100 represented in FIG. 1 is a simple embodiment of a mobile data network. For the sake of clarity in understanding the operation, FIG. 1 shows only the single access gateway 110, the single internal application function 116, and the single service gateway 122. However, those skilled in the art will appreciate that typical networks will include multiple access gateways 110, internal application functions 116 and service gateways 122.

Figure 2:
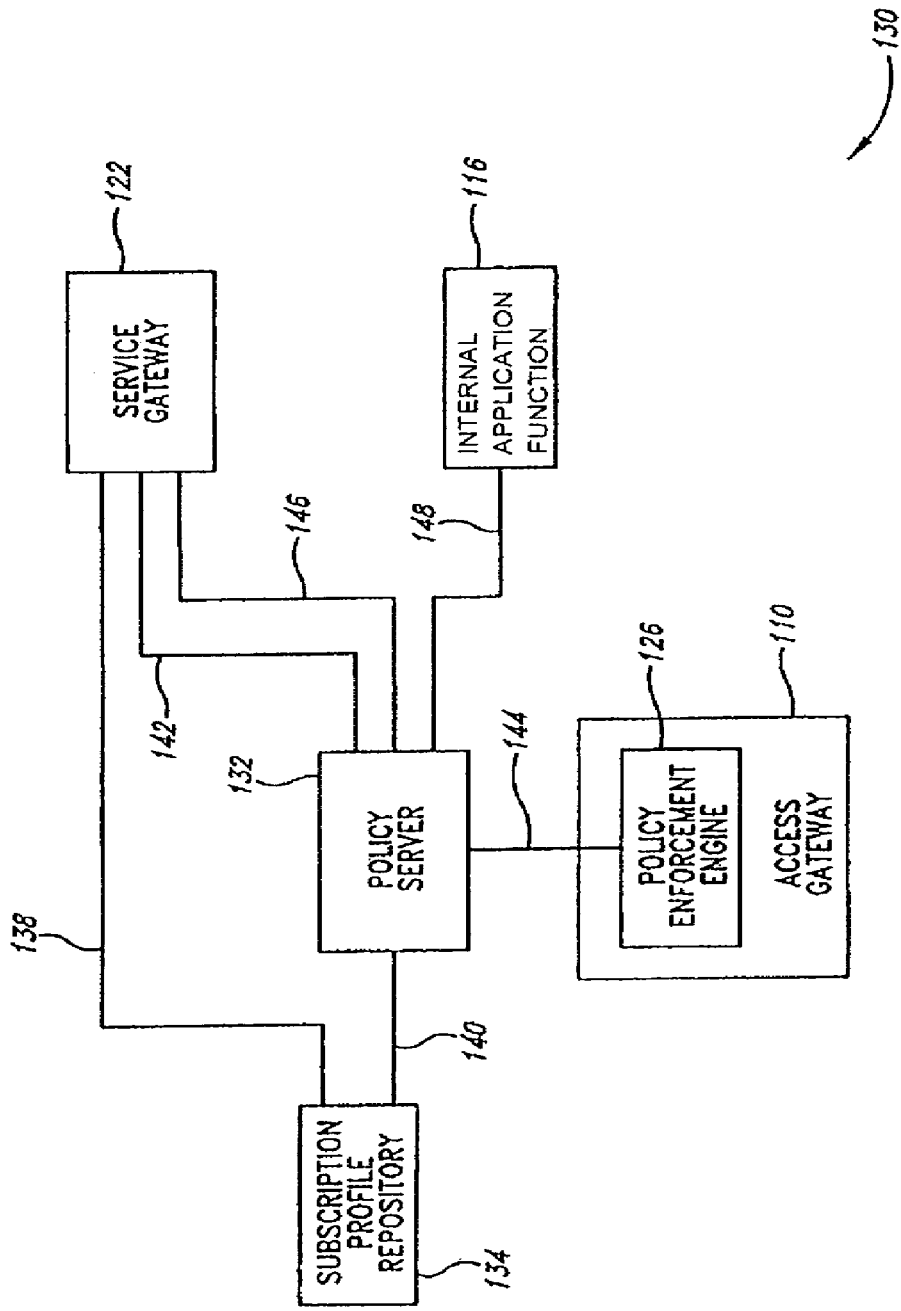
FIG. 2 shows a first embodiment of a dynamic mobile service control architecture used to provide control for the mobile data network of FIG. 1.

FIG. 2 shows a first embodiment of a dynamic mobile service control architecture 130 used to provide control for the mobile data network 100 of FIG. 1. For the sake of clarity, FIG. 2 shows signal plane logical elements and reference points while omitting most traffic plane elements and traffic flow links. This dynamic architecture 130 includes several signal plane logical elements that are also traffic plane elements, including the internal application function 116, the service gateway 122, and the policy enforcement engine 126 shown in FIG. 1. The dynamic architecture 130 includes a policy server 132 and a subscription profile repository 134.

The policy server 132 is configured to manage policies, to assemble policy rules, and to make policy decisions. Managing of policies includes the initial creation of policies, revision of policies, formatting of policies, storing policies, and routing of policies throughout the network 100. The policy server 132 is configured to assemble a policy rule for a particular service session and particular subscriber participating in the service session. The policy rule assembly is performed by selecting a policy using information about the service session (service information) and information about the subscriber (subscriber information), obtaining subscription information and generating the rule from the policy, subscription information, service session information and subscriber information. The policy server 132 is also configured to create a policy decision based on the policy rule and information about an access session. Access session information usually includes information identifying an access bearer (e.g., the second access bearer 112b) serving a mobile device (e.g., the second mobile device 114b) associated with the subscriber designated to participate in the service session.

The policy server 132 is logically linked to the policy enforcement engine 126. In some embodiments, the policy server 132 is physically deployed in the same access gateway 110 as the policy enforcement engine 126. In other embodiments, the policy server 132 is physically deployed in a physical network element other than the access gateway 110.

The subscription profile repository 134 is configured to store information about subscribers and the services to which they subscribe. A subscription information set may include a list of services that a particular subscriber is authorized to use, rates for these services, and preferences for these services. Service rates may be a default value or may be customized for a particular subscriber. Service preferences and options may be default values set by the network operator or may have been set by the subscriber. For example, a subscriber may have a preference for an SIP call service that an SIP call be routed to his work phone during working hours and be routed to his home phone after working hours.

A first subscription information reference point 138 logically links the subscription profile repository 134 and the service gateway 122. The first subscription information reference point 138 is configured to carry subscription information from the subscription profile repository 134 to the service gateway 122. The first subscription information reference point 138 facilitates the delivery of subscription information to external application functions (e.g., the external application function 124 of FIG. 1). For example, the external application function 124 may need subscription information in order to provide the SIP call service to the first mobile device 114a. The service gateway 122 is configured to request subscription information from the subscription profile repository 134, with the request carried over the first subscription information reference point 138. The subscription profile repository 134 is configured to send a subscription information set over the first subscription information reference point 138 to the service gateway 122. The service gateway 122 is configured to send the subscription information set to the external application function 124.

A second subscription information reference point 140 links the subscription profile repository 134 with the policy server 132. To generate a policy rule, the policy server 132 needs subscription information related to a particular subscriber and a particular service. The policy server 132 is configured to request this needed subscription information. The policy server 132 sends this request over the second subscription information reference point 140 to the subscription profile repository 134. The subscription profile repository 134 is configured to send the requested subscription information to the policy server 132 over the second subscription information reference point 140.

In some embodiments, the first and second subscription information reference points 138 and 140 conform with the 3GPP specification for the Sp reference point. In some embodiments, the first and second subscription information reference points 138 and 140 conform with the DIAMETER (IETF RFC3588) specification, but do not conform with the Sp specification. The first and second subscription information reference points 138 and 140 are not limited to any particular protocol.

The service gateway 122 is configured to enforce policies on service data flows passing through the service gateway (e.g., service data flow 118a). In some embodiments, the service gateway 122 is configured to enforce policies by enforcing policy rules. In other embodiments, the service gateway 122 is configured to enforce policies by enforcing policy decisions. A primary benefit of enforcing policies at the service gateway 122 is the ability to filter out at an early opportunity any packets for a service session with a subscriber that is not authorized to use that service on the mobile data network 100. This would prevent resources in the service providing network 108 from being needlessly used and would offload some policy enforcement burden from the access gateway 110.

In embodiments in which the service gateway 122 receives a policy rule from the policy server 132, the service gateway 122 enforces the rule by examining packets passing between the service gateway 122 and the access gateway 110. The service gateway 122 is configured to apply the instructions in the policy rule on any packets matching a service data flow filter in the policy rule (e.g., the first service data flow 118a).

As described above, the policy server 132 is configured to assemble a policy rule for a particular service session and particular subscriber participating in the service session. This assembly is performed by selecting a policy based on service information and subscriber information, obtaining subscription information and generating the rule from the policy, subscription information, service session information and subscriber information. In some embodiments, the policy server 132 is configured to receive the subscriber information from the policy enforcement engine 126. In other embodiments, the policy server 132 is configured to receive the subscriber information from the service gateway 122. In yet other embodiments, the policy server 132 is configured to receive the subscriber information from both the service gateway 122 and the policy enforcement engine 126.

The policy server 132 is configured to determine whether to send the policy rule to the service gateway 122 for enforcement or to generate a policy decision from the policy rule and send the policy decision to the policy enforcement engine 126 for enforcement. In some embodiments, the policy server decides where to send the policy rule for enforcement based on if the policy enforcement engine 126 requested the rule or whether the service gateway 122 requested the rule. In some embodiments, the policy server 132 decides where to send the policy rule based load balancing considerations and network efficiency considerations.

A first policy reference point 142 logically links the policy server 132 and the service gateway 122. The first policy reference point 142 is configured to carry subscriber information from the service gateway 122 to the policy server 132 and carry policy rules from the policy server 132 to the service gateway 122. A second policy reference point 144 is configured to carry subscriber information and access session information from the policy enforcement engine 126 to the policy server 132 and carry policy decisions from the policy server 132 to the policy enforcement engine 126.

In some embodiments, the first and second policy reference points 142 and 144 conform with the 3GPP specification for the Gx reference point. In some embodiments, the first policy reference point 142 conforms with the DIAMETER specification, but not the Gx specification. In some embodiments, the first and second policy reference points 142 and 144 do not conform with the Gx specification. The first and second policy reference points 142 and 144 are not limited to any particular signaling protocol.

The policy enforcement engine 126 is configured to enforce policy decisions on service data flows passing through the access gateway 110 (e.g., service data flows 118a and 118b of FIG. 1). The policy server 132 is configured to provide policy decisions for the policy enforcement engine 126. In the example of FIG. 2, the policy server 132 is configured to use information about the SIP call service session provided by the internal application function 116 to select an appropriate policy. Using subscriber information of the particular service and the service information, the policy server 132 can obtain related subscription information. Using the appropriate policy, the related subscription information, subscriber information, and service information, the policy server 132 can generate a policy rule for the SIP call service session. Using the policy rule and information about the second access bearer 112b (see FIG. 1), the policy server 132 can generate a policy decision.

A first service information reference point 146 provides a logical link between the service gateway 122 and the policy server 132. The first service information reference point 146 is configured to carry service information from the service gateway 122 to the policy server 132.

A second service information reference point 148 logically links the internal application function 116 and the policy server 132. In the example embodiment of FIG. 1, the internal application function 116 is providing a session of a second service, different from the service provided by the external application function 124, to the second mobile device 114b registered to the second subscriber. This second service session is carried in the second service data flow 118b through the second network access bearer 112b. The internal application function 116 is configured to send a request for a policy decision to the policy server 132 of FIG. 2. The internal application function 116 is configured to provide information about the second service to the policy server 132. The internal application function 116 is configured to send this second service information to the policy server 132 with the policy decision request.

In some embodiments, the first and second service information reference points 146 and 148 conform with the 3GPP specification for the Rx reference point. In some embodiments, the first and second service information reference points 146 and 148 conform with the DIAMETER specification, but do not conform with the Rx specification. The first and second service information reference points 146 and 148 are not limited to any particular protocol.

The policy enforcement engine 126 is further configured to generate information about the second subscriber and information about a second access bearer 112b. The policy server 132 uses the second service information received from the internal application function 116 and the second subscriber information received from policy enforcement engine 126 to request subscription information from the subscription profile repository 134. The policy server 132 is configured to use subscription information received from the subscription profile repository 134, and the service information from the internal application function 116 to generate a policy rule. The policy server 132 is configured to use the policy rule and the access bearer information received from the policy enforcement engine 126 to generate a policy decision. The policy server 132 is configured to push the policy decision to the policy enforcement engine 126. The policy enforcement engine 126 then enforces the policy decision on the second service data flow 118b.

Figure 3:
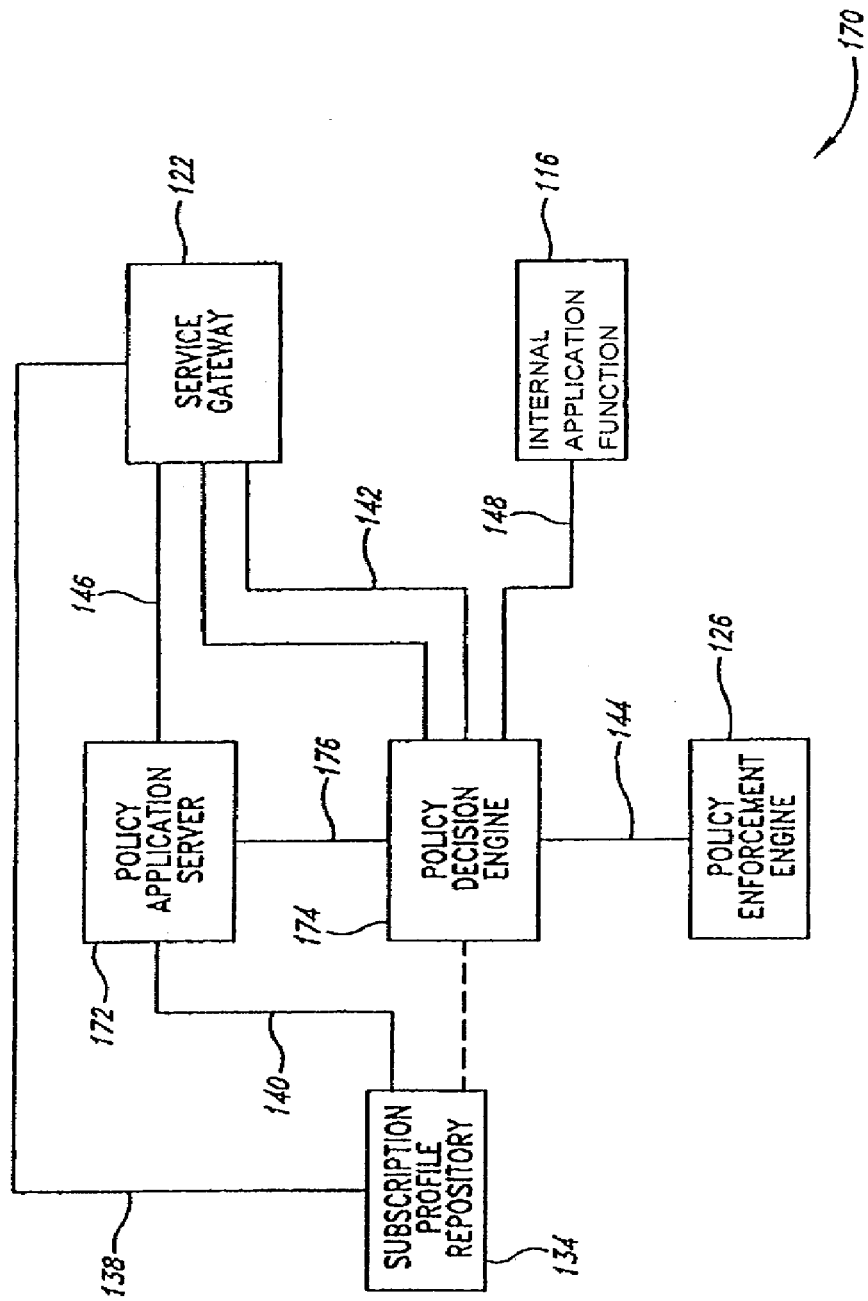
FIG. 3 shows a second embodiment of a dynamic mobile service control architecture used to provide control for the mobile data network of FIG. 1.

FIG. 3 illustrates a second embodiment of a dynamic mobile service control architecture 170 used to provide control for the mobile data network 100 of FIG. 1. The dynamic architecture 170 is substantially similar to the dynamic architecture 130 shown in the example of FIG. 2. The policy server 132 of FIG. 2 has been replaced by a policy application server 172 and a policy decision engine 174 that together perform the functions of the policy server 132. The policy application server 172 manages policies and assembles policy rules. The policy decision engine 174 is configured to make policy decisions using policy rules. This functional division frees the policy decision engine 174 from policy management tasks. This also allows the policy application server 172 to supply policy rules for a plurality of policy decision engines 174. In some embodiments, the policy decision engine 174 and the policy enforcement engine 126 are located in the same physical network element, but the policy application server 172 is located in a separate physical network element. In other embodiments, the policy application server 172, the policy decision engine 174 and the policy enforcement engine 126 are located in the same physical network element. In yet other embodiments, the policy application server 172, the policy decision engine 174 and the policy enforcement engine 126 are all located in different physical network elements. The invention is not limited by the physical locations of the policy server 172, the policy decision engine 174 and the policy enforcement engine 126.

In the dynamic architecture 170, the second subscription information reference point 140 logically links the subscription profile repository 134 and the policy application server 172. The second service information reference point 148 logically links the internal application function 116 and the policy application server 172. The first service information reference point 146 logically links the service gateway 122 and the policy application server 172. The first policy reference point 142 logically links the service gateway 122 and the policy application server 172. The second policy reference point 144 logically links the policy enforcement engine 126 and the policy decision engine 174.

A third policy reference point 176 provides a logical link between the policy application server 172 and the policy decision engine 174. The third policy reference point 172 is configured to carry policy rules from the policy application server 172 to the policy decision engine 174 and is configured to carry subscriber information from the policy decision engine 174 to the policy application server.

Figure 4:
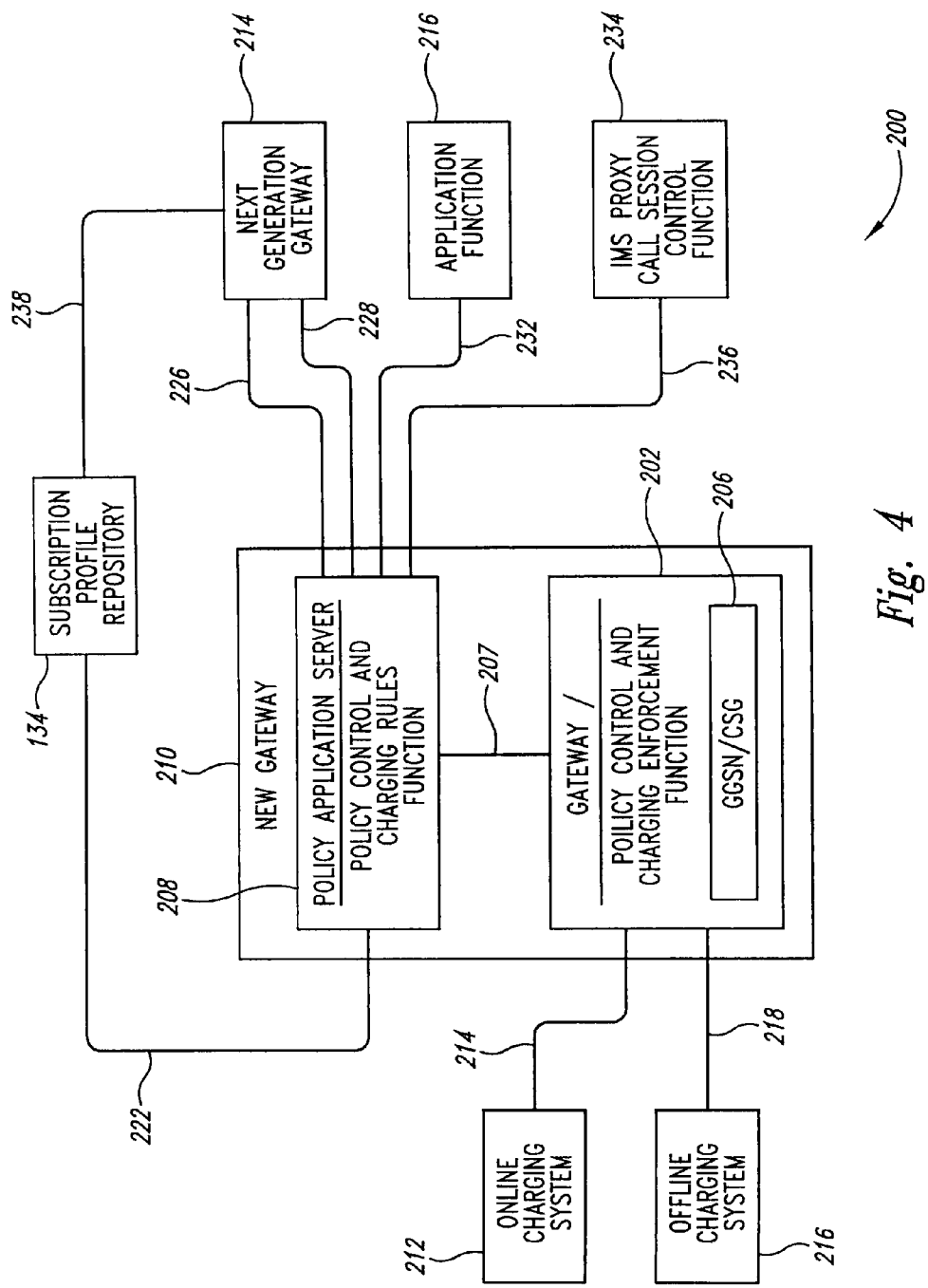
FIG. 4 shows a logical deployment diagram of a dynamic mobile service control architecture.

FIG. 4 shows a logical deployment diagram of a dynamic mobile service control architecture 200. At the core of the logical architecture 200 is a new gateway 210. The new gateway includes functions of a conventional GGSN 206. The new gateway 210 includes a combined policy server 208 and a combined gateway function 202. In some embodiments, the new gateway 204 is configured to perform policy-based routing.

The combined gateway function 202 includes a gateway function and a policy control and charging enforcement function (PCEF). In some embodiments, the combined gateway function 202 is configured to perform the functions of the policy enforcement engine 126 described above.

The combined policy server 208 is a logical element that has a policy application server (PAS) and a policy control and charging rules function (PCRF) 208. In some embodiments, the combined policy server 208 is configured to perform the functions of the policy server 132 described above. The combined gateway function 202 is logically linked to the combined policy server 208 through a policy reference point 207. In some embodiments, the policy reference point 207 is configured to perform the functions of the policy reference point 144, described above.

The combined gateway function 202 is logically linked to an online charging system (OCS) 212 through reference point Gy 214. The combined gateway function 202 is logically linked to an offline charging system (OFCS) 216 through a Ga or Gz reference point 218. The combined policy server 208 is logically linked to a subscription profile repository 220 through an Sp reference point 222.

The combined policy server 208 is logically linked to a next generation gateway 124 through a policy reference point 226 and a service reference point 228. In some embodiments, the next generation gateway 124 has some or all the features of the service gateway 122. In some embodiments, the next generation gateway 124 is a WEBNVAP gateway. In some embodiments, the policy reference point 226 is configured to perform the functions of the policy reference point 142, described above. In some embodiments, the service reference point 228 is configured to perform the functions of the service reference point 148, described above.

An application function 216 is logically linked to the combined policy server 208 through service reference point 232. In some embodiments, the application function 216 is configured to perform the functions of the application function 116, described above. In some embodiments, the service reference point 232 is configured to perform the functions of the service reference point 148, described above.

An IMS proxy call session control function (P-CSCF) 234 is logically linked to the PAS/PCRF 208 through a service interface point 236. In some embodiments, the next generation gateway 124 is logically linked to the subscription profile repository 120 through a logical reference point 238 conforming to LDAP or Diameter protocols. In some embodiments, the reference point 238 is configured to perform the functions of the subscription information reference point 138, described above.

Some or all of the components described herein may in some embodiments be implemented as a computer processor coupled to a memory, the memory containing instructions that when executed by the computer processor, perform the functions as described above. Some or all of the components may be implemented as hard-wired circuits.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A mobile data network with a dynamic mobile service control architecture comprising:

a service providing network;

an access network configured to provide a wireless connectivity to a mobile device registered to a subscriber;
an access gateway configured to route a service data flow between the service providing network and the access network, wherein the service data flow carries data packets for a service between an external application function and the mobile device, wherein the external application function is in an external network, wherein the external network is external to the mobile data network;
a policy server configured to generate a policy rule based on a subscriber information set and a first subscription information set, wherein the subscriber information set includes information about the subscriber and the first subscription information set includes information about subscriptions associated with the subscriber, wherein the policy server is further configured to send the policy rule to a service gateway; and
the service gateway, configured to route the service data flow between the mobile data network and the external network, wherein the service gateway is further configured to enforce the policy rule on the service data flow.

2. The mobile data network of claim 1, further comprising:
a first policy reference point configured to carry the policy rule from the policy server to the service gateway.

3. The mobile data network of claim 2, wherein the service gateway is further configured to generate the subscriber information set; and
wherein the first policy reference point is further configured to carry the subscriber information set from the service gateway to the policy server.

4. The mobile data network of claim 3, further comprising:
a policy enforcement engine, deployed as a part of the access gateway, configured to generate the subscriber information set; and
a second policy reference point configured to carry the subscriber information set from the policy enforcement engine to the policy server.

5. The mobile data network of claim 1, further comprising:
a subscription profile repository; and
a first subscription information reference point configured to carry the first subscription information set from the subscription profile repository to the policy server.

6. The mobile data network of claim 5, further comprising:
a second subscription information reference point configured to carry a second subscription information set from the subscription profile repository to the service gateway, wherein the second subscription information set includes information about subscriptions associated with the subscriber.

7. The mobile data network of claim 6, wherein the service gateway is further configured to send the second subscription information set to the external application function.

8. A mobile data network with a dynamic mobile service control architecture comprising:
a service providing network;
an access network configured to provide a wireless connectivity to a first mobile device registered to a first subscriber;
an access gateway configured to route a first service data flow between the service providing network and the access network, wherein the first service data flow carries data packets for a first service between an external application function and the first mobile device, wherein the external application function is in an external network, wherein the external network is external to the mobile data network;
a subscription profile repository configured to send a first subscription information set associated with the first subscriber to a service gateway; and
the service gateway, configured to route the first service data flow between the mobile data network and the external network, wherein the service gateway is further configured to send the first subscription information set to the external application function.

9. The mobile data network of claim 8, further comprising:
a first subscription information reference point configured to carry the first subscription information set from the subscription profile repository to the service gateway.

10. The mobile data network of claim 9, further comprising:
a policy server configured to generate a first policy rule based on a first service information set, a first subscriber information set, and the first subscription information set, wherein the first service information set includes information about the first service, the first subscriber information set includes information about the first subscriber and the first subscription information set includes information about subscriptions associated with the first subscriber, wherein the policy server is further configured to send the first policy rule to the service gateway; and
wherein the service gateway is further configured to enforce the first policy rule on the first service data flow.

11. The mobile data network of claim 10, further comprising:
a first service information reference point configured to carry the first service information set from the service gateway to the policy server; and
a first policy reference point configured to carry the first policy rule from the policy server to the service gateway.

12. The mobile data network of claim 11, wherein the service gateway is further configured to generate the first subscriber information set; and
wherein the first policy reference point is further configured to carry the first subscriber information set from the service gateway to the policy server.

13. The mobile data network of claim 12, further comprising:
a policy enforcement engine configured to generate the first subscriber information set; and
a second policy reference point configured to carry the first subscriber information set from the policy enforcement engine to the policy server.

14. The mobile data network of claim 13, further comprising:
an internal application function configured to provide a session of a second service to a second subscriber, the second service carried in a second service data flow through an access bearer, wherein the internal application function is further configured to provide a second service information set to the policy server, wherein the second service information set includes information about the second service;
wherein the policy enforcement engine is further configured to generate a second subscriber information set and an access bearer information set, wherein the second subscriber information set includes information about the second subscriber and the access bearer information set includes information about the access bearer;
wherein the subscription profile repository is configured to send to the policy server a second subscription information set, wherein the second subscription information set includes information about a subscription associated with the second subscriber; and wherein the policy server is further configured to assemble a second policy rule based on the second service information set, the second subscription information set, and the second subscriber information set;

wherein the policy server is further configured to generate a policy decision based on the second policy rule and information about the access bearer; wherein the policy server is further configured to send the policy decision to the policy enforcement engine via the second policy reference point; and wherein the policy enforcement engine is further configured to enforce the policy decision on the second service data flow.

15. The mobile data network of claim 14, further comprising:

a second subscription information reference point configured to carry the second subscription information set from the subscription profile repository to the policy server; and a second service information interface to carry the second service information set from the internal application function to the policy server.

16. The mobile data network of claim 14, wherein the policy server is deployed as a part of the access gateway, wherein the access gateway is a physical network element.

17. A mobile data network with a dynamic mobile service control architecture comprising:

a service providing network;

an access network configured to provide a wireless connectivity to a first mobile device registered to a first subscriber;

an access gateway configured to route a first service data flow between the service providing network and the access network, wherein the first service data flow carries data packets for a first service between an external application function and the first mobile device, wherein the external application function is in an external network, wherein the external network is external to the mobile data network;

a subscription profile repository configured to send a first subscription information set associated with the first subscriber to a service gateway;

a policy application server configured to generate a first policy rule based on a first service information set, a first subscriber information set, and the first subscription information set, wherein the first service information set includes information about the first service, the first subscriber information set includes information about the first subscriber and the first subscription information set includes information about subscriptions associated with the first subscriber;

the service gateway, configured to route the first service data flow between the mobile data network and the external network, wherein the service gateway is further configured to send the first subscription information set to the external application function, wherein the service gateway is further configured to enforce the first policy rule on the first service data flow, wherein the service gateway is further configured to generate the first subscriber information set.

18. The mobile data network of claim 17, further comprising:

a policy enforcement engine configured to generate the first subscriber information set;

an internal application function configured to provide a session of a second service to a second subscriber, the second service carried in a second service data flow through an access bearer, wherein the internal application function is further configured to provide a second service information set to the policy application server, wherein the second service information set includes information about the second service;

wherein the policy enforcement engine is further configured to generate a second subscriber information set and an access bearer information set, wherein the second subscriber information set includes information about the second subscriber and the access bearer information set includes information about the access bearer;

wherein the subscription profile repository is configured to send to the policy application server a second subscription information set, wherein the second subscription information set includes information about a subscription associated with the second subscriber; and wherein the policy application server is further configured to assemble a second policy rule based on the second service information set, the second subscription information set, and the second subscriber information set;

a policy decision engine to generate a policy decision based on the second policy rule and information about the access bearer, wherein the policy decision engine is further configured to send the policy decision to the policy enforcement engine; and wherein the policy enforcement engine is further configured to enforce the policy decision on the second service data flow.

19. The mobile data network of claim 18, wherein the policy decision engine is deployed as a part of the access gateway, wherein the access gateway is a physical network element.

20. The mobile data network of claim 19, wherein the policy application server is deployed as a part of the access gateway.

* * * * *